(12) United States Patent
Shilliday et al.

(10) Patent No.: US 7,837,223 B2
(45) Date of Patent: Nov. 23, 2010

(54) INFLATABLE CUSHIONING DEVICE

(75) Inventors: David M. Shilliday, Phoenix, AZ (US); Lih-Sheng Kang, Chandler, AZ (US); Gregory A. Mowry, Phoenix, AZ (US); Gregory B. Grace, Mesa, AZ (US); John F. Bartell, Apache Jet, AZ (US)

(73) Assignee: Zodiac Automotive US Inc., Tempe, AZ (US)

( * ) Notice: Subject to any disclaimer, the term of this patent is extended or adjusted under 35 U.S.C. 154(b) by 187 days.

(21) Appl. No.: 10/589,778

(22) PCT Filed: Feb. 16, 2005

(86) PCT No.: PCT/US2005/005120
§ 371 (c)(1), (2), (4) Date: Apr. 25, 2008

(87) PCT Pub. No.: WO2005/082682
PCT Pub. Date: Sep. 9, 2005

(65) Prior Publication Data
US 2008/0211210 A1  Sep. 4, 2008

(51) Int. Cl.
B60R 21/16 (2006.01)
(52) U.S. Cl. .................................. 280/730.2
(58) Field of Classification Search ........... 280/730.2, 280/729, 733
See application file for complete search history.

(56) References Cited

U.S. PATENT DOCUMENTS

| 5,322,322 | A | * | 6/1994 | Bark et al. | 280/730.2 |
| 5,480,181 | A | * | 1/1996 | Bark et al. | 280/730.2 |
| 5,588,672 | A | * | 12/1996 | Karlow et al. | 280/730.2 |
| 5,941,564 | A |   | 8/1999 | Acker |  |
| 6,042,141 | A |   | 3/2000 | Welch et al. |  |
| 6,152,481 | A | * | 11/2000 | Webber et al. | 280/730.2 |
| 6,168,190 | B1 |   | 1/2001 | Bowers et al. |  |
| 6,189,918 | B1 |   | 2/2001 | Stavermann |  |
| 6,237,942 | B1 |   | 5/2001 | Swann |  |
| 6,273,457 | B1 |   | 8/2001 | Fischer |  |
| 6,276,712 | B1 | * | 8/2001 | Welch et al. | 280/730.2 |
| 6,505,853 | B2 |   | 1/2003 | Brannon et al. |  |
| 6,508,487 | B2 | * | 1/2003 | Koster | 280/730.2 |
| 6,517,110 | B1 | * | 2/2003 | Butters et al. | 280/749 |
| 6,612,611 | B1 |   | 9/2003 | Swann et al. |  |
| 6,648,368 | B2 |   | 11/2003 | Smith et al. |  |
| 6,758,490 | B2 |   | 7/2004 | Hoeft et al. |  |
| 7,025,378 | B2 |   | 4/2006 | Wang |  |

(Continued)

FOREIGN PATENT DOCUMENTS

DE   200 16471 U1   2/2001

(Continued)

*Primary Examiner*—Faye M. Fleming
(74) *Attorney, Agent, or Firm*—Dean W. Russell; Kilpatrick Stockton LLP

(57) ABSTRACT

Inflatable devices principally for vehicle occupant protection are addressed. Included among the devices are curtains or other cushions (18) with braided portions (42) along their lower edges (30) designed to form semi-rigid members when deployed. Unlike commercially-available vehicle curtains, inflation occurs from the bottom (where the semi-rigid member is formed) upward. The devices additionally optionally may include inflatable nodes (46) within the curtains (18) or otherwise extending from the cushions.

18 Claims, 6 Drawing Sheets

U.S. PATENT DOCUMENTS

| | | |
|---|---|---|
| 7,048,301 B2 | 5/2006 | Walsh |
| 2005/0006882 A1 | 1/2005 | Wang |
| 2005/0012313 A1 | 1/2005 | Walsh |
| 2005/0184492 A1 | 8/2005 | Shilliday et al. |

FOREIGN PATENT DOCUMENTS

| | | |
|---|---|---|
| DE | 20016471 | 2/2001 |
| DE | 10258245 | 6/2004 |
| EP | 0924122 | 6/1999 |

* cited by examiner

INFLATABLE CUSHIONING DEVICE

CROSS REFERENCE TO RELATED APPLICATION

This application claims priority to U.S. patent application Ser. No. 10/783,667 entitled "Inflatable Cushioning Device" filed with the U.S. Patent and Trademark Office on Feb. 20, 2004, the contents of which are incorporated herein by reference.

BACKGROUND OF THE INVENTION

This application relates to devices for protecting vehicle occupants and more particularly (but not exclusively) to curtains or other cushions designed to inflate when a vehicle is impacted. The cushions are especially adapted as protective designs when side-impact collisions occur and are intended to reduce likelihood of occupants being ejected from the vehicle. They may, however, be useful in other circumstances and perform other protective functions too.

FIELD OF THE INVENTION

Commonly-owned U.S. Pat. No. 5,322,322 to Bark, et al., whose contents are incorporated herein in their entirety by this reference, describes an existing protective system for vehicle occupants. Versions of the system, designed to be mounted along the periphery of a side window of a vehicle (at or near the roof rail), include but are not limited to a braided tube containing a gas generator. As noted in the Bark patent:

> When a side impact is detected, the gas generator is ignited, inflating the braided tube. As the braided tube inflates, the diameter of the tube increases and its length decreases. The tube then pulls out of its storage location and forms a taut, semi-rigid structural member across the vehicle's window.

See Bark, Abstract, 11. 7-12.

Because vehicle rollovers sometimes also occur, inflatable curtains have been devised in attempts to reduce adverse effects of the rollovers to vehicle occupants. Many existing curtains are slow to deploy, however. Others fail to develop sufficient contraction for tension near or at the vehicle beltline to prevent occupant ejection.

One set of improved curtains is illustrated in U.S. Pat. No. 6,505,853 to Brannon, et al., whose contents are incorporated herein in their entirety by this reference. Like other inflatable curtains, the ones of the Brannon patent are "inflatable from the roof of the vehicle downward," see Brannon, col. 1, 1. 15; col. 3, 11. 45-47, and lack any braided portion. Instead, these curtains, when deployed, tension a helical portion of an elongated member by increasing both its diameter and length. See id., col. 3, 11. 55-67. Additionally, because these curtains inflate from the roof of the vehicle downward, their inflators and mounting equipment are typically fixed to the vehicle and thus unable to move.

As headroom in and interior space of larger personal vehicles (such as sport-utility vehicles, or "SUVs") increases, utilizing existing devices to protect human occupants is becoming increasingly difficult. Compounding this issue is the wide range of heights and sizes of potential occupants, as statistically, optimizing device inflation for a male having height and weight in the ninety-fifth percentile among men, for example, might result in less-than-optimal head (and body) protection for a female with height and weight in the fifth percentile among women. Conversely, optimizing device inflation characteristics for small women might result in less-than-optimal protection for large men.

SUMMARY OF THE INVENTION

The present invention provides alternatives to the inflatable devices of, for example, the Bark and Brannon patents. Utilizing braids—similar to those of the Bark patents—at the lower edges (with "lower" being defined while the vehicle is upright), devices of the present invention comprise curtains or other cushioning devices adapted to inflate from the lower portions upward. Doing so creates an inflation pattern opposite that of conventional curtains, allowing for greater uniformity in tension at the lower edges and rapid deployment of the devices. Because inflated from their lower portions upward, devices of the present invention effectively "pull" the corresponding curtains out of their covers rather than only "push" them out, as is done with existing curtains.

Embodiments of the invention additionally may include inflatable nodes extending outward through portions (such as through the braid or knit) of the devices. In these embodiments, the braid need not necessarily exist at the lower edges of the devices. Regardless of braid placement, however, including such additional inflatable material may enhance protection of various portions of bodies of human occupants notwithstanding their potentially-differing heights and sizes. Due to the structure created by the braided material when inflated, robust locating of inflatable sections can be achieved more easily.

Versions of the present invention typically comprise an elongated cover in which an inflatable curtain or other cushioning apparatus is placed when deflated. Such cover advantageously is mounted to or near the roof rail of a vehicle, although it may be mounted elsewhere as appropriate or desired. Incorporated into the curtain is a braided, inflatable tube (or similar knitted or other structure). Preferably, the tube spans the lower edge of the curtain, although it need not necessarily do so.

When the braided tube is inflated, it decreases in length while its diameter increases. This action pulls the curtain out of the cover and tensions the lower edge, creating a taut, generally linear, semi-rigid structure helping reduce the risk of occupant ejection through the side window during a vehicle crash such as a rollover. Because the (deploying) lower portion of the curtain is being inflated, the inflation device for the curtain will travel along with the braided tube. The braided material can be designed in a non-homogenous fashion such that the cross-section of the braided section changes as one travels along the length of the vehicle. This is advantageous in the area of the seat, where the allowable space for the curtain to deploy is limited. By reducing the cross-section in this area, improved trajectory of the curtain can be achieved.

Optionally extending upward from the tube within the curtain are one or more inflatable nodes. These nodes are fluidly connected and may be inflated concurrently with the braided tube (through slots or other openings therein), so that inflation occurs upward from their lower edges. The nodes function primarily to cushion an occupant's head in an attempt to reduce head injury to occupants when a vehicle collision occurs. Depending on their placement they may, however, provide some torso or thoracic protection as well. The placement of a node may be downward to provide torso protection such as by inserting the inflated node between the occupant's shoulder and the intruding vehicle structure. The node may affirmatively push an occupant's shoulder inboard reducing the effects of contact and interaction between the occupant and the intruding vehicle. Due to the stress on the fabric from the inflation gas flowing from the first section to the nodes, a bonded construction may be used in place of traditional sewing to ensure retention of the gas under these high stresses.

Moreover, although the invention is designed principally with regard to side-impact and rollover situations and to reduce the risk of ejection or head injury, its concepts may be used in other circumstances or for protection of other parts of the body as well. Alternatively, the braid may be attached to the outside (rather than incorporated within) the curtain in some embodiments of the invention. In such circumstances the braid likely will have a U-shaped, instead of (generally) circular, cross-section so as not to interfere with inflation of the nodes.

It thus is an optional, non-exclusive object of the present invention to provide inflatable cushions that inflate from lower portions to upper portions (with "lower" defined when the vehicles in which the cushions are placed are upright).

It is another optional, non-exclusive object of the present invention to provide inflatable cushions that include braided, knitted, or other components designed to contract to create tension linearly.

It is also an optional, non-exclusive object of the present invention to provide inflatable cushions in which an inflation device travels with the braided tube during deployment.

It is a further optional, non-exclusive object of the present invention to provide inflatable cushions with inflatable nodes.

It is yet another optional, non-exclusive object of the present invention to provide inflatable nodes that inflate from their lower edges to their upper edges.

It is another optional, non-exclusive object of the present invention to provide inflatable nodes that inflate from their lower edges of the tubular braid structure downward to interpose themselves between the shoulder or torso of the occupant and the intruding vehicle structures during a crash.

It is, moreover, an optional, non-exclusive object of the present invention to provide inflatable cushions adapted to reduce risk of injury during side-impact collisions and vehicle rollovers.

Other objects, features, and advantages of the present invention will be apparent to those skilled in the relevant art with reference to the remaining text and the drawings of this application.

DETAILED DESCRIPTION

Figure 1:
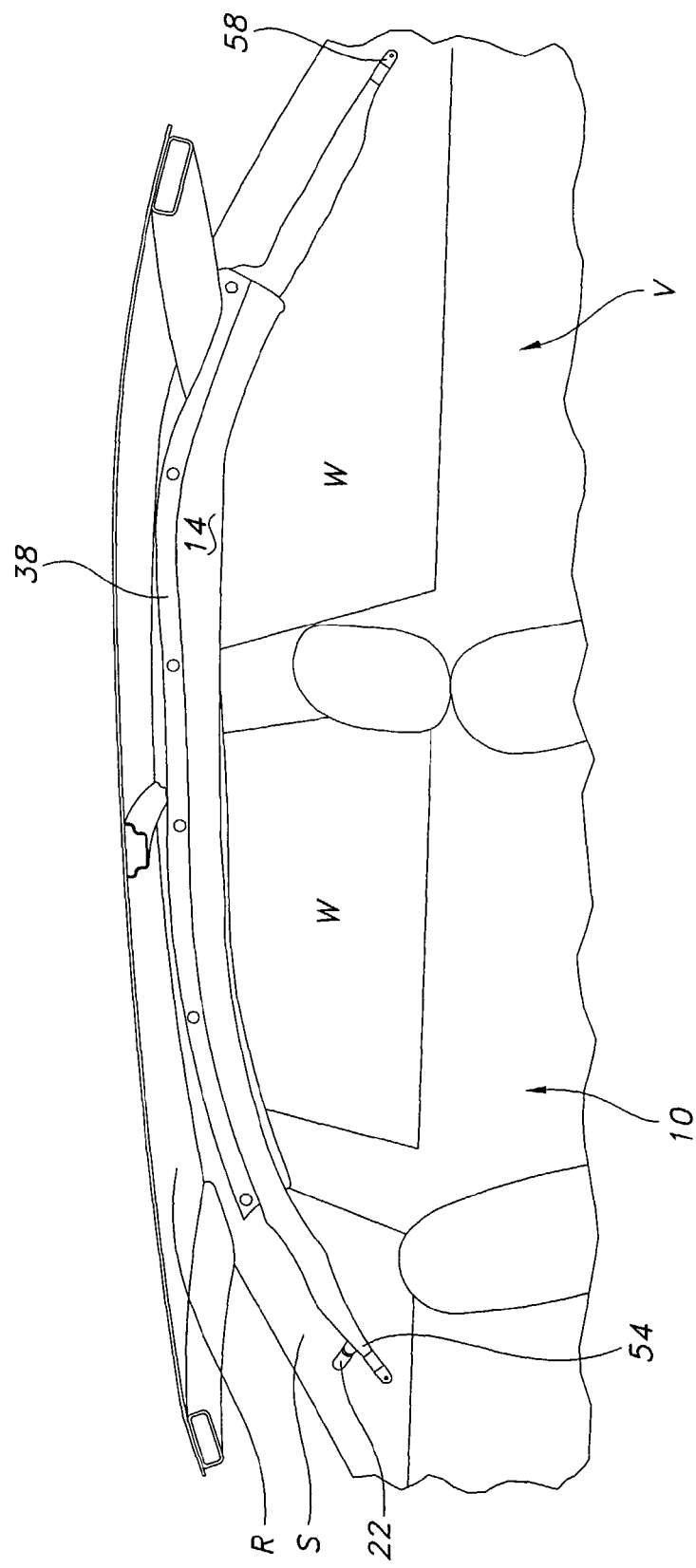
FIG. 1 illustrates an exemplary cushioning device, in the form of a curtain, in an undeployed state.
Figure 2:
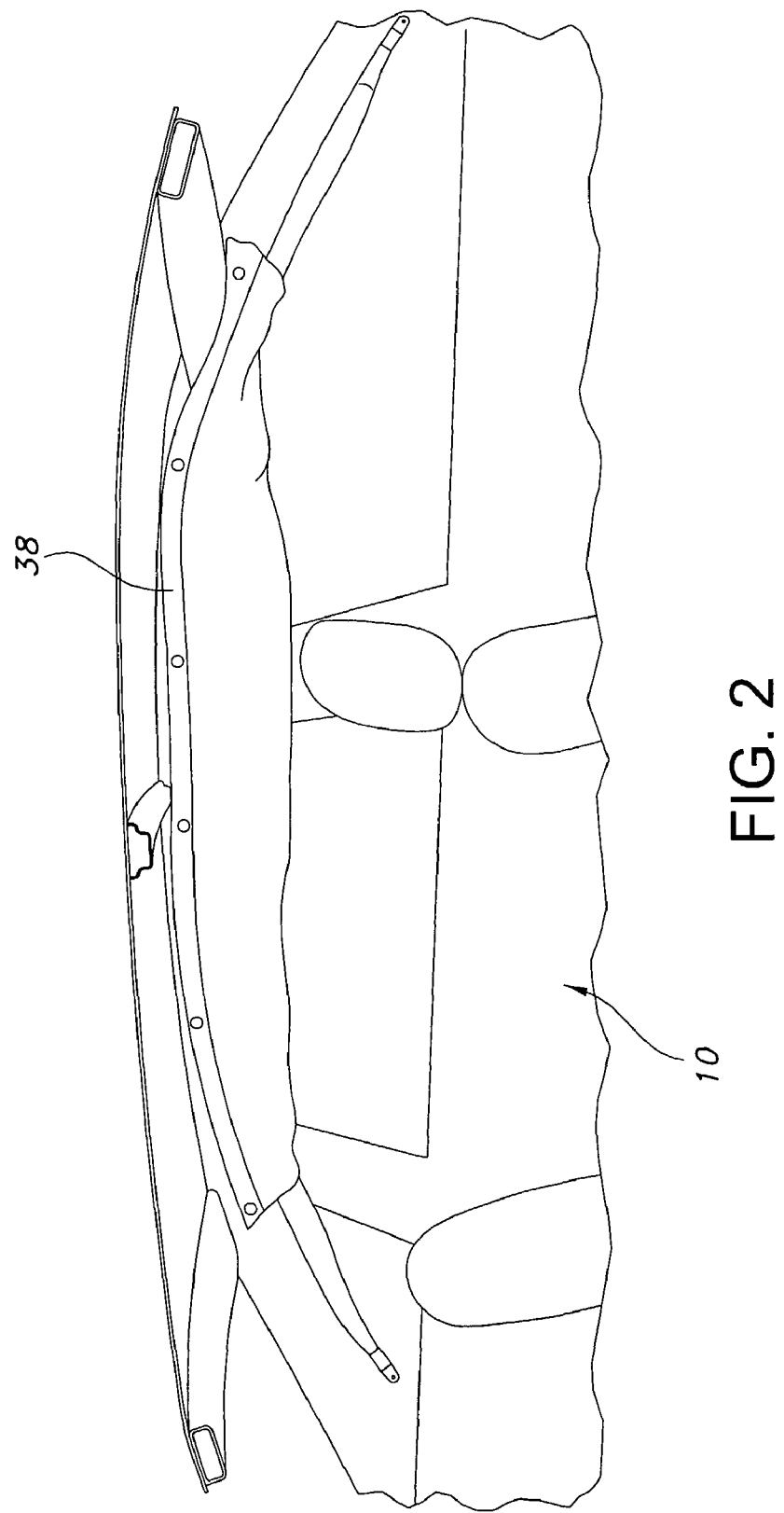
FIG. 2 illustrates the device of FIG. 1 when partially deployed.
Figure 3:
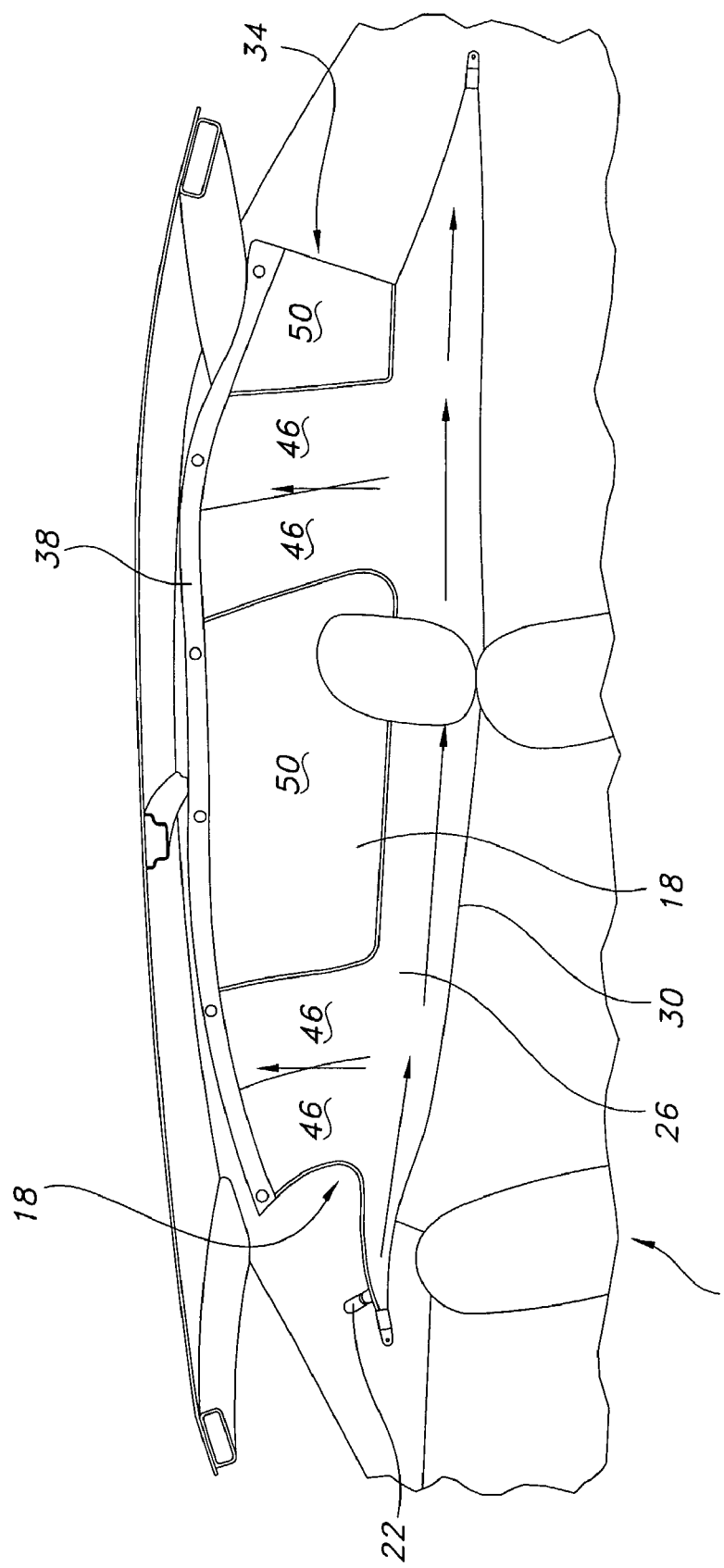
FIG. 3 illustrates the device of FIG. 1 when fully deployed.

FIGS. 1-3 detail device 10 of the present invention. As shown in FIGS. 1-3, device 10 is mounted to side structure S of vehicle V, generally along the upper periphery of windows W adjacent roof rail R. Although these figures illustrate a presently preferred mounting position of device 10, the device 10 may be mounted, or otherwise attached to or within vehicle V, differently than is shown in FIGS. 1-3.

Included as parts of device 10 are cover 14, inflatable curtain 18, and inflator 22. As illustrated in FIG. 1, most or all of curtain 18 is positioned within, and thereby protected by, cover 14 when uninflated. While advantageous to utilize cover 14, it is not absolutely necessary for use of device 10. If present, though, cover 14 may incorporate a tear-away seam or other mechanism permitting egress of curtain 18 for deployment. Likewise, device 10 may include a fill tube for facilitating fluid communication between inflator 22 and curtain 18, although such fill tube too is not absolutely necessary.

As best illustrated in FIG. 3, curtain 18 beneficially comprises lower portion 26 defining lower edge 30 and upper portion 34 defining upper edge 38. In the version of device 10 depicted in FIG. 3, lower portion 26 includes a braided tube (an example of which is identified as tube 42 of FIG. 5). Upper portion 34, by contrast, includes nodes 46 separated by uninflated sections 50. Although four nodes 46 are illustrated in FIG. 3, fewer or greater numbers of nodes 46 may be present in any particular device 10. Additional nodes may also point out in any radial direction from the center of the braided section. In this manner, the nodes can be adapted to offer additional protection for any given requirement of occupant protection.

Curtain 18 may be constructed of any appropriate materials. Conventional air bag fabrics and materials may, for example, be used. Similarly, braided tube 42 may be sewn to or otherwise incorporated into curtain 18. Braided tube 42 itself may be constructed as described in the Bark patent. It need not necessarily be tubular, however, and instead could form other shapes when inflated. (Furthermore, those skilled in the art will recognize that, in certain circumstances, other materials adapted to provide taut, semi-rigid structures when inflated may be used in place of tube 42.)

Viewed sequentially, FIGS. 1-3 illustrate deployment of curtain 18. As noted earlier, FIG. 1 depicts device 10 with curtain 18 uninflated and vehicle V upright, the normal operating mode for both device 10 and vehicle V. Should a sensor associated with vehicle V detect a collision (or any other deployment-worthy event), it signals inflator 22 to inflate curtain 18.

FIG. 2 shows early-stage inflation of device 10 (at, nominally, approximately five milliseconds), with the remainder of curtain 18 being pulled downward from its upper edge 38. FIG. 3 details full inflation of curtain 18, with both tube 42 and nodes 46 fully inflated. With tube 42 fully inflated, it forms a taut, semi-rigid, generally linear structural member whose ends 54 and 58 are directly or indirectly (through inflator 22) attached to a side of vehicle V, which assists in maintaining the positioning and rigidity of curtain 18 regardless of orientation of the vehicle V.

Also shown in FIG. 3 by arrows are the fluid paths used to effect inflation of device 10. Gas generated by or via inflator 22 enters tube 42 in the lower portion 26 of curtain 18, travelling within tube 42 to inflate it. As gas travels within tube 42, it encounters nodes 46, with some of the gas diverting to fill the nodes 46. As is clear from FIG. 3, curtain 18 thus inflates from its lower portion 26 upward, opposite the process conventionally used for inflating curtains. Equally clear from FIGS. 1-3 is that lower portion 26 of curtain 18 moves downward as inflation occurs, and that inflator 22 pivots, or otherwise moves, in conjunction therewith.

Figure 4:
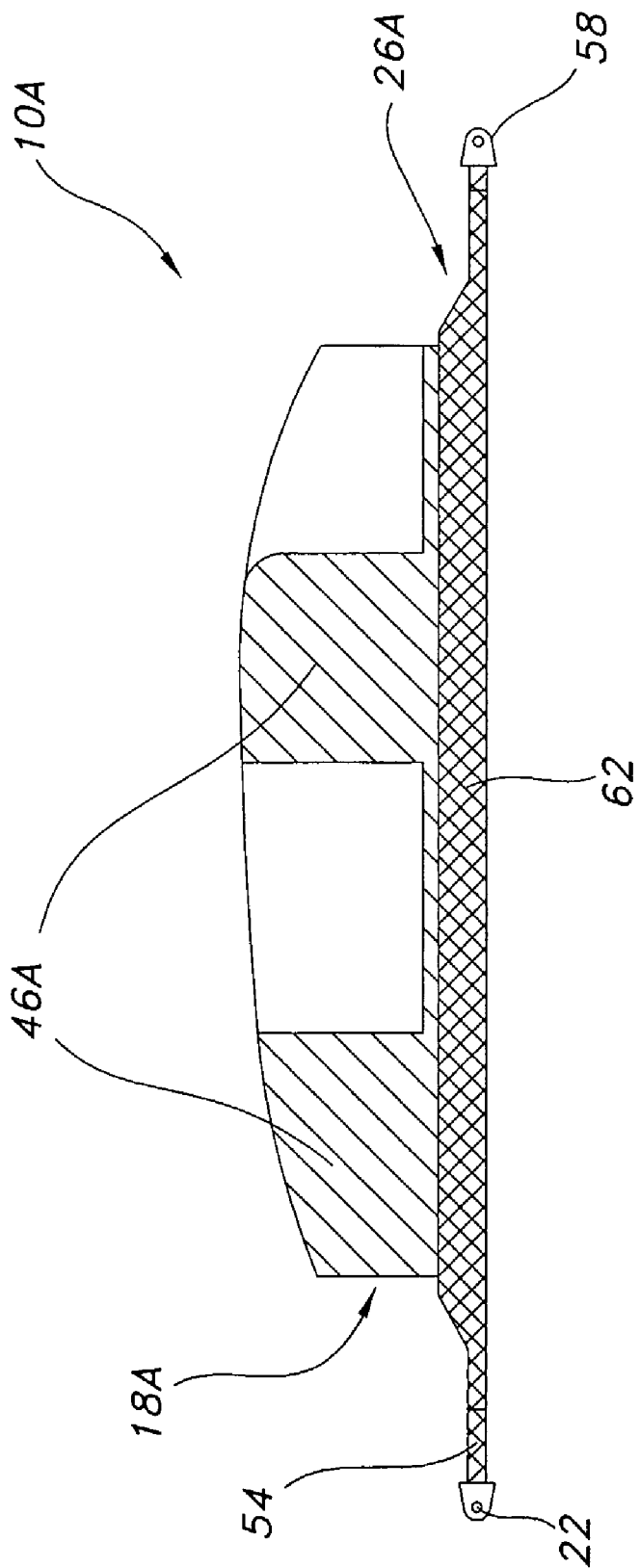
FIG. 4 illustrates a first alternative cushioning device, in the form of a curtain to which braided material has been added, in a deployed state.

FIG. 4 illustrates an alternative device 10A of the present invention. Device 10A may be similar to device 10, albeit with braided material 62 positioned externally of lower portion 26A of curtain 18A. Because sewn or otherwise attached to the exterior of curtain 18A, braided material 62 preferably has a U-shaped (rather than circular) cross-section, so as not to impede inflation of nodes 46A. In use, braided material 62 functions as does tube 42, decreasing in length and increasing in width as curtain 18A inflates in order to form a relatively taut, semi-rigid member.

Because both devices 10 and 10A utilize braid generally horizontally attached to or within respective curtains 18 and 18A, substantially the entire lengths of tube 42 and material 62 are available to transfer loads. Consequently, point-loading issues associated with prior devices are reduced. Utilizing braid additionally provides greater mechanical strength to devices 10 and 10A and permits greater tension to be achieved than with existing devices. Incorporating inflatable nodes 46 or 46A into devices 10 or 10A additionally improves performance, as head-impact energy may be transferred to gases within nodes 46 or 46A rather than solely into a tensioned piece of fabric.

Figure 5:
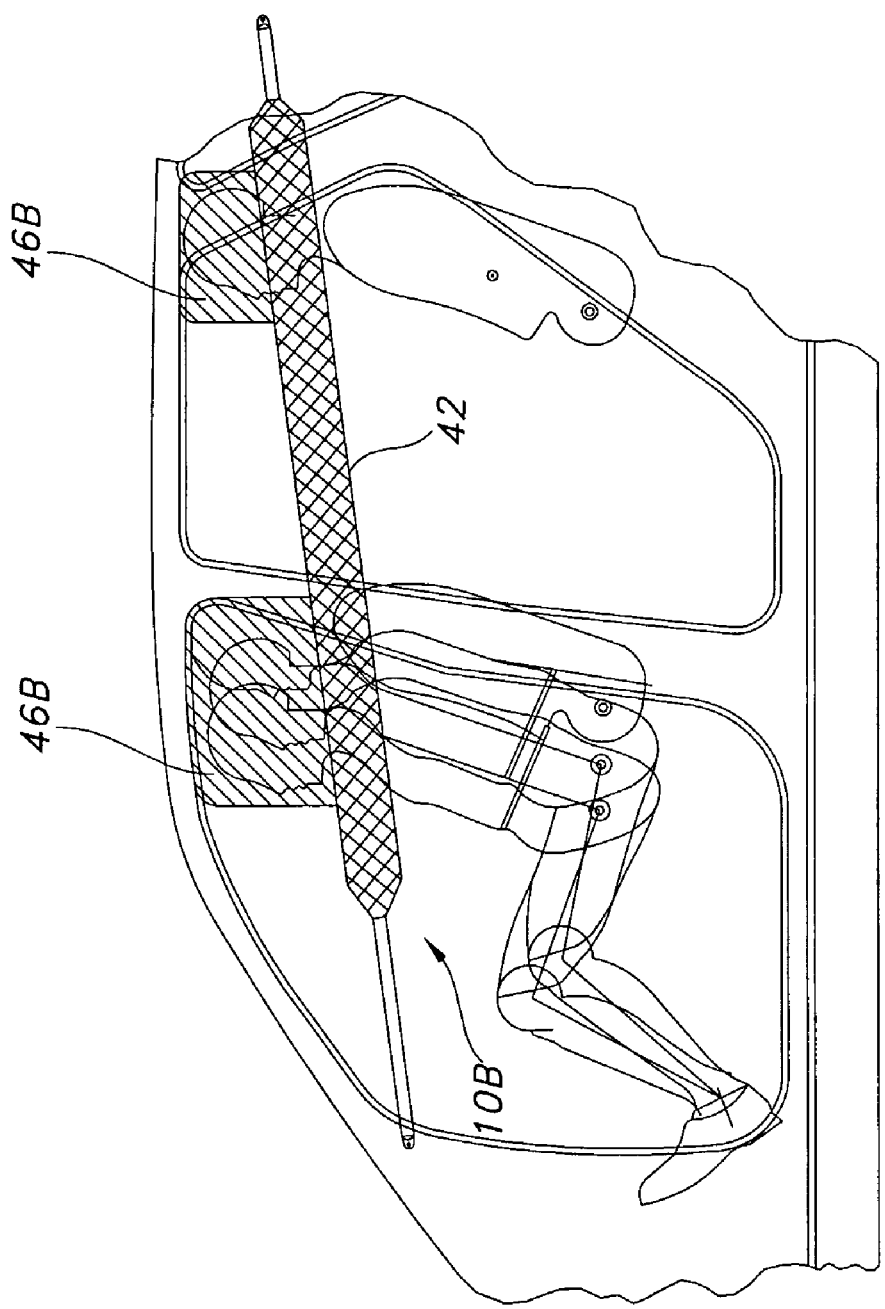
FIG. 5 illustrates an alternative cushioning device, in the form of a tubular structure with nodes, in a deployed state.
Figure 6:
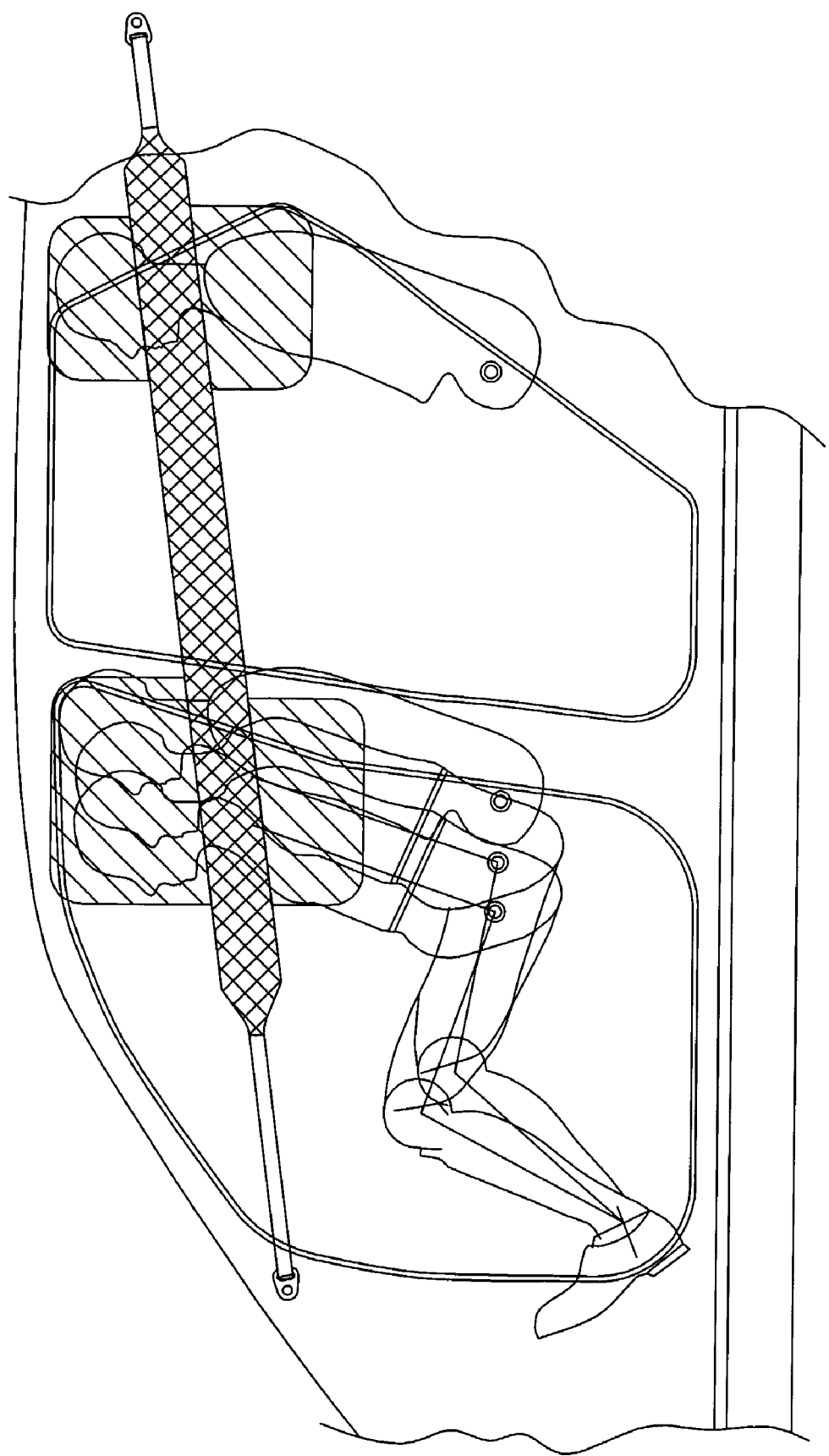
FIG. 6 illustrates an alternative cushioning device, in the form of a tubular structure with downward nodes, in a deployed state.

Detailed in FIG. 5 is another alternative device 10B. Device 10B includes some features of devices 10 and 10A yet is not in the form of a curtain. Instead, as deployed (as shown in FIG. 5), device 10B more closely resembles the systems of the Bark patent, albeit with one or more inflatable nodes 46B protruding upward from braided tube 42.

The foregoing is provided for purposes of illustrating, explaining, and describing exemplary embodiments and certain benefits of the present invention. Modifications and adaptations to the illustrated and described embodiments will be apparent to those skilled in the relevant art and may be made without departing from the scope or spirit of the invention. As non-limiting examples, nodes 46 or 46A alternatively could extend downward from tube 42 or material 62, respectively, in appropriate circumstances, and regardless of orientation could attempt to provide torso protection either in addition to or instead or protection for the head of an occupant. Additionally, although devices 10, 10A, and 10B are designed principally for use in automobiles and other land-based vehicles, they may be used in other vehicles or for other purposes as appropriate or desired.

What is claimed is:

1. Protective device for an occupant of a vehicle comprising an inflatable cushion having first and second portions, the first portion being above and/or below the second portion when the vehicle is upright, and in which (a) inflation of the second portion commences before inflation of the first portion, (b) the first and second portions are configured to receive inflation fluid, and (c) inflation fluid entering the first portion has already passed through at least part of the second portion.

2. Protective device according to claim 1 in which the second portion comprises a material that decreases in length when inflated so as to create tension.

3. Protective device according to claim 2 in which the length-decreasing material is distributed substantially uniformly and continuously throughout the second portion.

4. Protective device according to claim 3 where a bonded construction is used to manage the transfer of fluid between the first and second sections without significant leakage.

5. Protective device according to claim 1 in which the first portion comprises at least one inflatable node adapted, when inflated, to be positioned at approximately head level of the occupant.

6. Protective device according to claim 5 in which the first portion further comprises uninflated material adjacent the at least one inflatable node.

7. Protective device according to claim 1 further comprising an inflator connected to the vehicle and to the second portion and capable of moving as the second portion inflates.

8. Protective device comprising:
  a. an inflator;
  b. an inflatable curtain in fluid communication with the inflator and comprising:
    i. a first inflatable portion configured to receive inflation fluid and comprising material that decreases in length when inflation occurs; and
    ii. a second inflatable portion (A) from which the first inflatable portion extends and (B) configured to receive inflation fluid and have its inflation commence before inflation of the first inflatable portion commences, such that inflation fluid entering the first inflatable portion has already passed through at least part of the second inflatable portion; and
  c. a cover in which the inflatable curtain is positioned when uninflated.

9. Protective device according to claim 8 in which inflation of the inflatable curtain pulls the inflatable curtain downward out of the cover.

10. Protective device according to claim 9 in which the material is braided and has generally circular or U-shaped cross-section.

11. Protective device according to claim 10 in which the braided material has a non-uniform shape, in order to improve deployment between the seat and the vehicle structure.

12. Protective device according to claim 10 in which the material forms a taut, semi-rigid, generally linear member when the first inflatable portion is inflated.

13. Protective device according to claim 12 in which the inflator moves with the material when the inflatable curtain is pulled downward out of the cover.

14. Protective device for an occupant of a vehicle comprising an inflatable cushion having first and second portions, each configured to receive inflation fluid, and in which (i) inflation of the second portion commences before inflation of the first portion, (ii) the first portion comprises at least one inflatable node extending outward from the second portion, and (iii) inflation fluid entering the first portion has already passed through at least part of the second portion.

15. Protective device according to claim 14 where the inflatable node is positioned optimally for one or more of:
  A. torso protection;
  B. head protection; or
  C. pre-loading of the occupant.

16. Protective device according to claim 1 in which the first portion comprises at least one inflatable node adapted, when inflated, to be positioned at approximately shoulder level of the occupant.

17. Protective device according to claim 1 in which the first portion is below the second portion when installed in an upright vehicle so as to protect the torso of the occupant.

18. Protective device according to claim 1 in which the first portion is above the second portion when installed in an upright vehicle so as to protect the head of the occupant.

* * * * *

UNITED STATES PATENT AND TRADEMARK OFFICE
CERTIFICATE OF CORRECTION

Page 1 of 1

PATENT NO. : 7,837,223 B2
APPLICATION NO. : 10/589778
DATED : November 23, 2010
INVENTOR(S) : Shilliday et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 516 days.

Signed and Sealed this
Third Day of May, 2011

David J. Kappos
*Director of the United States Patent and Trademark Office*